July 4, 1933.   R. F. HALL   1,916,475
AIRPLANE
Filed June 16, 1931   2 Sheets-Sheet 1

Inventor
Randolph F. Hall
By
Attorney

July 4, 1933.  R. F. HALL  1,916,475
AIRPLANE
Filed June 16, 1931   2 Sheets-Sheet 2
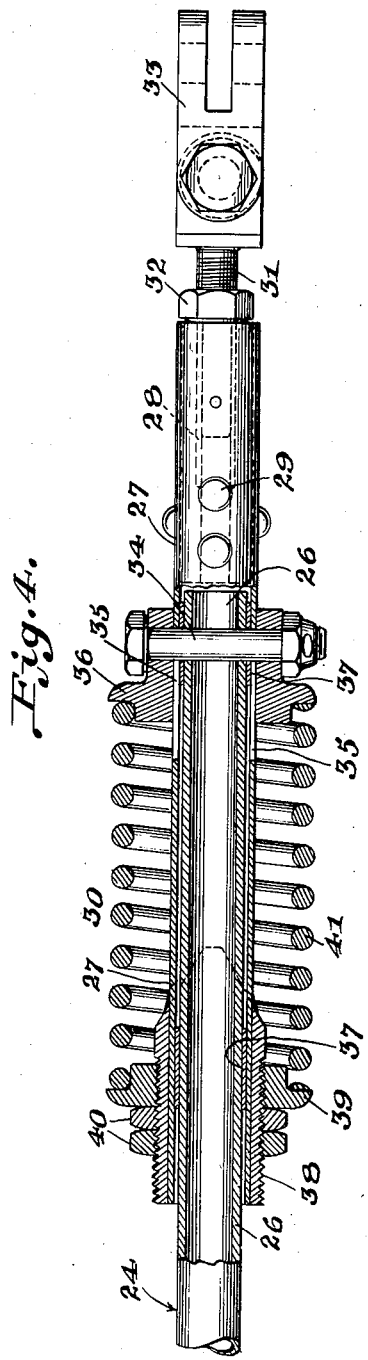
Inventor
Randolph F. Hall
By
Attorney Patented July 4, 1933

1,916,475

UNITED STATES PATENT OFFICE

RANDOLPH F. HALL, OF ROCHESTER, NEW YORK

AIRPLANE

Application filed June 16, 1931. Serial No. 544,884.

This invention relates to certain improvements in airplanes; and the nature, objects and characteristics of the invention will be readily recognized and understood by those skilled in the aeronautical art in the light of the following explanation and detailed description of the accompanying drawings illustrating what I at present consider to be the preferred embodiments or mechanical and aerodynamical expressions of my invention from among various other forms, arrangements, combinations and constructions of which the invention is capable within the spirit and the scope thereof.

Basically, the invention provides for automatically increasing the lift capacity of an airplane wing or wing cellule having lateral control surfaces or ailerons, through the utilization of such control surfaces or ailerons for automatic functioning and operation to simultaneously lower when the wing is under and subjected to high angle of attack or low speed conditions of flight, and to raise and return to normal position carrying out the normal or high speed contour and airfoil section of the wing when the wing is subjected to and flown under low angle of attack or high speed flight conditions. The invention further provides as a basic feature thereof, the carrying out of such automatic lift capacity increasing functioning and operation of the lateral control surfaces or ailerons, without interfering with or interrupting the normal pilot controlled operation of the ailerons for lateral control, during and throughout the range of such automatic operation of the ailerons, while obtaining a tendency toward improved lateral control characteristics and increased lateral control effectiveness through the aerodynamic interrelationship between the automatic functioning of the ailerons and their functioning for lateral control.

The invention is primarily characterized by a mounting and relative arrangement of the lateral control surfaces or ailerons on or with respect to a wing, for automatic actuation of the ailerons by variations in the airflow pressures acting thereon to simultaneously lower to increase wing lift capacity under high angle of attack or low speed conditions and to raise under low angle of attack or high speed conditions, with either aileron throughout the range of automatic operation upwardly swingable by the lateral control mechanism to secure lateral control; and the invention is secondarily characterized by the inclusion of means continuously exerting forces on said ailerons tending to and simultaneously lowering the same under high attack angle or low speed conditions, but which means are overcome by the air pressures acting on the ailerons under low attack angle or high speed conditions to permit the ailerons to simultaneously raise and be held in normal position by such air pressures, all while retaining independent lateral control operation of the ailerons simultaneously therewith and without interruption by such automatic actuation thereof.

A further feature of the invention resides in the embodiment and incorporation of the foregoing basic principles and characteristics of the invention in a wing of the variable lift-flap type in which the flap forms a portion of the wing under surface and the automatically operating ailerons or lateral control surfaces form portions of the wing upper surface above the flap or flaps, in which the relative arrangement of the flap or flaps and the ailerons is such that through cooperation of the automatically actuating lift capacity increasing ailerons, as well as the lateral control operation of the ailerons, with the flap or flaps, an increased lift for the wing and improved lateral control characteristics and effectiveness are obtained.

Another particular feature of the invention is the incorporation of the automatically operating lift increasing lateral control surfaces or ailerons in a wing of the automatic variable lift types in which a wing flap is automatically controlled to increase lift capacity at high attack angle conditions, and in the relative cooperative arrangement of such ailerons with such a flap or flaps, whereby a relation is automatically maintained therebetween and especially during high attack angle or low speed conditions to increase the lift capacity of the wing and thereby permit of slower speeds under high attack angle conditions.

A further feature of the invention is found in the arrangement, mounting, and operation of such automatically functioning wing lift capacity increasing lateral control surfaces or ailerons, by which, when the ailerons are operated for lateral control there will be no material turning or yawing tendency developed on the airplane.

As certain of the general objects and results to which the invention is devoted, may be mentioned the increase in the speed range of an airplane in which the invention is utilized, the material improvement in take-off and landing characteristics, and in the lateral control, and the general increase in operating safety, contributed to largely by the decrease in piloting skill and technique required.

The invention is further featured by the embodiment of certain principles thereof to the control of the elevator of an airplane tail group or empennage, for automatic operation of the elevator independently of the pilot control thereof under certain flight conditions.

With the foregoing features, results and objects in view, as well as certain others which will be recognized from the following explanation, the invention consists in certain novel features in design, construction and relative arrangements and combinations of elements, all as will be more fully and particularly referred to and specified hereinafter.

Referring to the accompanying drawings:

Fig. 1 is a vertical transverse section, more or less diagrammatic, through a variable lift wing of the air displacement passage, automatically operating flap type, embodying and incorporating the automatically operating wing lift capacity increasing lateral control surface or aileron arrangement of my invention, the wing flap and aileron being shown in full lines in automatically depressed, high wing attack angle or low speed positions, with the lateral control, raised position of the aileron indicated in dotted outline.

Fig. 4 is a view, partly in longitudinal section and partly in plan, of the force unit of the invention interposed in and forming a part of one of the aileron control tubes of the lateral control system.

Fig. 5 is a purely diagrammatic view in outline of an automatically functioning aileron of the invention embodied in a conventional type of wing, the aileron being shown in full lines in lowered position for the high attack angle or low speed wing conditions, and being shown by dotted lines in raised position for lateral control purposes.

Fig. 6 is a view similar to Fig. 5, but with the aileron shown in full lines in automatically raised position carrying out the normal wing contour with the wing under low attack angle or high speed conditions.

The invention, while not so limited, is of particular utility and efficiency when incorporated in and combined with a wing of the automatically operating variable lift, flap types, such as the "Hall" types of convertible or variable lift wings embodying an air displacement passage through a wing with an automatically functioning rear wing flap for opening and closing the passage and varying the wing camber in accordance with airflow conditions acting on the wing and flap. Such "Hall" type of wing is disclosed in Figs. 1 to 3 of the accompanying drawings with the automatically functioning, wing lift capacity increasing and lateral control improving ailerons or control surfaces and their operating means of the invention embodied therein and incorporated and combined in mechanical and aerodynamic relation therewith.

This embodiment is a preferred expression of a use and adaptation of the invention because it reduces certain conditions encountered in the lateral control of this type of wing and materially increases the lift capacity thereof, so that such embodiment serves to clearly exemplify the principles and features of the invention. Other embodiments and applications of the invention are explained and disclosed hereinafter, and the above referred to preferred embodiment is not to be considered as a limitation in all respects of the basic scope or range and variety of adaptations and embodiments of which the invention is capable.

Figure 1:
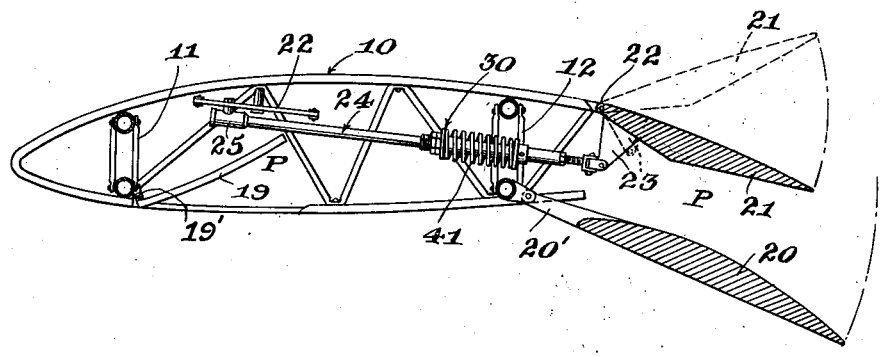
Figure 2:
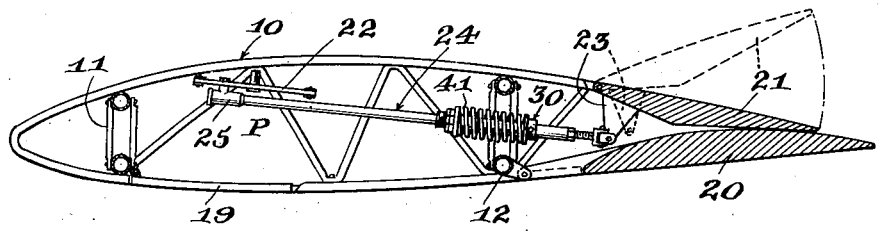
Fig. 2 is a view similar to Fig. 1, but with the wing at low attack angle, high speed conditions, and the flap and aileron in normal raised position carrying out the normal or high speed contour of the wing.
Figure 3:
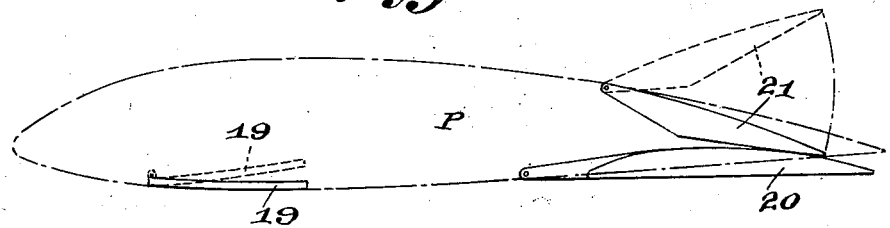
Fig. 3 is a view, more or less diagrammatic, showing in outline the flap and aileron of Figs. 1 and 2, in an intermediate position between full lowered and normal raised positions, the wing and the normal raised position of the aileron and flap being indicated in dot and dash outline.

An automatically functioning high lift wing of the above referred to "Hall" type and incorporating my invention is disclosed in Figs. 1 to 3. The wing 10 is formed to provide the longitudinally disposed air displacement passage P extending rearwardly therethrough between the spaced upper and lower covering of the wing, with its inlet end opening downwardly through the lower covering or surface of the wing adjacent the wing leading edge controlled by a forward vane 19 mounted for inward swinging, and its rear discharge end adjacent the trailing edge and below the upper surface of the wing controlled by the vertically swinging flap member 20. This rear flap member 20 is located forming a portion of the wing under surface and in normal raised, passage discharge closing position forms a portion of and carries out the normal under surface contour of the wing. (See Fig. 2.) The forward vane 19 in normal lowered position closes the inlet end of passage P and forms a portion of the wing under surface carrying out the normal contour thereof (see Fig. 2).

The wing 10 includes the forward beam or spar 11 and the rear beam or spar 12, both of the open truss girder type with the rear spar permitting flow of air rearwardly therethrough in passage P. In the present instance, the front or passage inlet controlling and freely floating vane 19 is pivotally mounted along its leading edge to the forward spar 11 by the pivot or hinge members 19', only one of which is here shown. The rear flap 20 is pivotally mounted for vertical swinging to and adjacent the rear spar 12, by the remote hinge members 20', only one of which is here shown, so that in lowered, downwardly swung positions of flap 20 a space or gap for rearward flow of air, is formed between the flap leading edge and the wing structure, as will be clear by reference to Fig. 1 of the drawings.

The operation of wing 10 is automatic and may be briefly summarized as follows. The arrangement and relative proportions, mounting and other design factors for the flap 20 are such that, with wing 10 in low angle of attack or high speed flight, the air pressures acting on flap 20 raise and maintain the same in raised, normal position carrying out the normal or high speed contour of the wing, and the passage inlet vane drops to normal closed position, all as shown in Fig. 2. When the wing is flown under high angle of attack or low speed conditions, the variations in air pressures acting on front vane 19 and the rear flap 20, are such that vane 19 is forced upwardly to passage opening position, and rear flap 20 swings downwardly to position opening the discharge end of passage P and increasing the wing under surface camber, as clearly presented by Fig. 1 of the drawings. In such position of flap 20 and vane 19, air is displaced rearwardly through passage P and with the increased camber given by flap 20 in lowered position the lift capacity of the wing is increased. On return of the wing to low attack angle or high speed conditions, vane 19 closes and flap 20 raises to normal passage closing position, the functioning of vane 19 and flap 20 being automatic and in accordance with wing flight and air flow conditions.

In certain forms and arrangements of a wing of the type of wing 10, force exerting means acting on flap 20 to aid and assist its operation are provided, but any such means are not here shown as being unnecessary in an exemplification of air automatically operating wing of the flap type with which the form of the invention now under consideration is particularly concerned.

The invention provides the lateral control surfaces or ailerons 21 pivotally mounted on and forming portions of the wing upper surface above the automatically functioning flap or flaps 20, respectively. Attention is here called to the fact that it is deemed necessary in the present disclosure to show but one of the ailerons 21, as these ailerons are mounted in the generally conventional location at opposite sides or adjacent opposite ends, respectively, of the wing 10, as familiar to those skilled in this art. Similarly, it is to be noted that the term "wing" is used herein to include both a continuous wing structure or a wing structure formed of opposite wing panels or wings, both of which are conventional in the art. So with respect to the term "flap", such term is employed herein to include a continuous flap, or opposite wing flaps, or a plurality of spanwise alined flap sections or flaps.

Each lateral control surface or aileron 21 is pivotally mounted at 22 along its forward or leading edge to the wing structure for vertical swinging in the usual manner, and is so designed and mounted as to form a trailing edge portion of the wing upper surface above flap 20, and when in normal or substantially neutral control position, with flap 20 in normal raised, passage closing position, to form and carry out with raised flap 20, the normal or high speed contour and airfoil section of the wing 10. Such normal position of an aileron 21 and automatically functioning flap 20 is shown in Fig. 2 of the drawings, and in the particular design of an aileron 21 there shown, the aileron under surface may present a portion thereof for engagement with and bearing on the upper surface of the wing flap 20.

The ailerons 21 are operated by the usual conventional pilot control mechanism familiar in the art for simultaneous differential raising and lowering of the ailerons, respectively, a portion only of which is here shown by the operating crank 22 pivotally mounted within the wing, above vane 19 in this instance, and horizontally swingable by the usual operating cables (not shown) leading to and actuated by the pilot's control (not shown). Each aileron 21 is provided with the depending operating horn or crank 23 which is operatively connected with its respective operating crank 22 by the push and pull tube unit 24 coupled to crank 22 at its forward end by the universal connection, such as a ball and socket joint 25. (See Figs. 1 and 2.) The pilot controlled aileron operating mechanism, a portion only of which is here shown, is preferably of any of the differential types familiar in the art, by which the up-aileron is moved a distance several times that of the down aileron, such for example as an up-aileron movement of 32° and a simultaneous down movement of the opposite aileron of say 8°, although the invention is not limited to any degree of differential movement, or in all respects to differential up and down aileron movements.

Following the generic principle of the invention, the ailerons 21, only one of which is here shown as previously explained, are simultaneously lowered to increase wing lift capacity with wing 10 under high attack angle or low speed flight conditions, and passage P with wing flap 20 automatically functioning to increase wing lift. In the embodiment here shown, such simultaneous depression or lowering of the ailerons 21, is carried out by the interposition and connection in each tube unit 24, of a force unit 30 which continuously exerts a force on the respective aileron with which the tube unit is operatively connected, tending to depress or swing the aileron downwardly to lowered positions, but which is so designed and arranged, that with the tube unit, the aileron is vertically swingable for lateral control during and in any positions automatically assumed by the aileron under the control of its respective force unit 30. The force units 30, only one of which is here shown, tend to and will under certain conditions, simultaneously lower ailerons 21, but without interfering with the desired lateral control operation of the ailerons throughout their range of independent automatic functioning. A force unit 30 and the tube unit 24 in which it is operatively coupled and forms a part, is shown in detail by Fig. 4 of the drawings, to which reference is now made.

The tube unit 24 includes a tube 26 connected at its forward end to the operating crank 22 (see Figs. 1 and 2) of the lateral control mechanism by the universal connection 25, and a tube 27 axially slidably and telescopically fitted over and receiving the adjacent inner end length of tube 26. The opposite or rear end of tube 27 has an internally threaded bushing 28 suitably secured therein, as by rivets 29, and adjustably receives the jaw bolt 31 threaded thereinto and extending rearwardly and axially from tube 27. A nut 32 is provided on bolt 31 for engaging the end of tube 27 to lock bolt 31 in any adjusted position. The outer or rear end of jaw bolt 31 pivotally carries a clevis fitting 33 for connection to the aileron horn or crank 23 (see Figs. 1 and 2), the arrangement forming a universal connection between the tube unit 24 and its respective aileron 21.

The inner end of tube 26 within tube 27, carries a bolt 34 diametrically therethrough and fixed therein against movement axially of the tube. The bolt 34 extends outwardly through slots 35 in the opposite walls of tube 27, and secures a collar 36 slidably on and over the exterior of tube 27, the collar 36 being movable by and with tube 26 as the latter tube is moved axially of and with respect to tube 27 in which it is slidably fitted. Preferably, any suitable spaced bearing members or rings 37 are carried by inner tube 26, on which the outer tube 27 is slidably engaged. On the forward or free end of outer tube 27, an externally threaded sleeve 38 is suitably secured, as by welding the sleeve to the tube, and a collar 39 is adjustably threaded thereon and locked in any adjusted position longitudinally of tube 27, by the double lock nuts 40. A coiled spring 41 is placed over and around tube 27 between and with its ends seated on collars 36 and 39, the spring being normally held under compression between these collars, and spaced around and out of contact with tube 27.

The spring 41 of tube and force unit 24—30, normally continuously forces collars 36 and 39 away from each other, and as collar 36 is carried from tube 26 and collar 39 by tube 27, these tubes are slid inwardly of each other to maintain the tube unit 24 at its shortest length with bolt 34 engaged against the rear ends of slots 35 in tube 27 (see Fig. 4). Now, with the tube unit 24 connected between aileron crank 23 and the operating crank 22, and spring 41 of force unit 30 maintaining the tube unit at its shortest length, the setting is such as to depress and maintain the aileron 21 with which the tube unit is connected, in lowered downwardly swung position, assuming the lateral control mechanism in neutral position, such depressed or lowered position of the aileron being shown in Fig. 1. Upon the application of an upwardly acting force of sufficient magnitude on the depressed aileron 21 of Fig. 1 to overcome the force of spring 41, the aileron 21 swings upwardly drawing or pulling tube 27 with collar 39 rearwardly over tube 26, slots 35 in tube 27 permitting such rearward movement of tube 27 past bolt 34, and spring 41 is further compressed with aileron 21 maintained in raised position until the force thereon is removed to allow expansion of spring 41 and downward swinging of the aileron thereby.

In the operation of ailerons 21 in cooperative relation with wing passage P and flap 20 of the wing of the type of wing 10, assuming the lateral control including operating cranks 22 in neutral aileron position, when wing 10 is under low angle of attack or high speed flight conditions, referring now to Fig. 2 of the drawings, passage P is closed by vane 19 and flap 20 is swung upwardly to normal or high speed contour position on the wing and maintained in such position, by the air pressures acting thereon. The ailerons 21 will each, due to the increased suction above the wing 10, swing upwardly or raise, overcoming and compressing the springs 41 of their respective force units and lengthening their tube units 24, to locate both ailerons in normal raised position, shown for one of the ailerons 21 in Fig. 2, carrying out with raised flap 20 the normal or high speed contour and airfoil section for wing 10.

In such low attack angle or high speed and automatically assumed position of ailerons 21, they are freely operable for lateral control actuation. Operation of the lateral control cranks 22 will through tube units 24 raise one of the ailerons to the position indicated by dotted lines in Fig. 2, while the opposite aileron is simultaneously moved downwardly, but to a considerably less degree as previously explained, which downwardly moving aileron presses against the flap 20 beneath it resulting in a lowering of such flap and increase in wing lift at the desired side for increased lateral control effectiveness. The arrangement of the tube units 24 and their included force units 30 for the ailerons, is such as to tend to cause the differential up and down aileron movements, that is, greater up aileron movement than down aileron movement, thus materially reducing the turning or yawing moments developed by lateral control actuation. Obviously, the extent of down aileron and engaged under flap 20 movement, is dependent upon and influenced by the force exerted by spring 41.

When the wing 10 passes from the above low attack angle high speed flight conditions, to high attack angle or low speed conditions, the under flaps 20 automatically move to the lowered position of Fig. 1 and the passage inlet vane 19 moves to raised, passage opening position, with air displacing rearwardly through passage P, and the lift of wing 10 increased. Upon release of the pressure holding ailerons 21 in raised position of Fig. 2, caused by the high attack angle or low speed airflow and pressure conditions, the spring 41 of each aileron force unit 30 exerts a force of sufficient magnitude to force collars 36 and 39 their maximum distance apart with bolt 34 seated against the rear ends of slots 35 and the shortest length given tube unit 24. This spring action automatically swings the ailerons downwardly to the position with respect to and cooperating aerodynamically with lowered flap 20 and open passage P, as shown in full lines by aileron 21 of Fig. 1, with resulting material increase in the lift capacity of the wing.

With the wing 10 and ailerons 21 thereof in their automatically lowered position of Fig. 1, under high attack angle or low speed flight, the ailerons are freely operable for lateral control through tube and force units 24—30 by actuation of cranks 22. Operation of the lateral control mechanism will rock one operating crank 22 to force its tube unit 24 rearwardly, and tube 26 carried bolt 34 being engaged at the rear ends of tube 27 slots 35, aileron 21 will be swung to raised position as indicated by dotted lines in Fig. 1. The opposite aileron will be simultaneously lowered but to a less degree than the raised aileron, such limited lowering being effected or materially contributed to due to a compression of the spring of its force unit 30 and lengthening of its tube unit 24, by the increased positive pressure at the under side of the downward moving aileron.

Between the above explained high and low attack angle conditions of flight of wing 10, the functioning of flaps 20 and ailerons 21 will of course vary and be dependent upon angle of attack or speed. For example, at cruising speed, referring here to the diagrammatically indicated positions of Fig. 3, each under flap 20 and aileron 21 may be slightly lowered and passageway P substantially closed, depending upon the design of the operating mechanism and force unit. When one aileron is raised to dotted line position of Fig. 3, it will cause forward passage P inlet vane 19 to move approximately to the dotted line position of Fig. 3, allowing flow of air through passage P, and such flow, aileron 21 being raised, will interfere with airflow above the wing and tend to increase control effectiveness by decreasing lift at that side of the wing.

With a wing flap 20 locked or secured in raised passage closing position of Fig. 2 against automatic operation, ailerons 21 would still be operable for lateral control. Up aileron movement would take place as hereinbefore described, but down aileron movement would be prevented by flap 20, the spring 41 of the down aileron force unit compressing under the forward movement of tube 26 independently of tube 27.

The design and arrangement of the tube units 24 and force units 30 combined and operatively incorporated therein, enables the obtaining of added differential up and down aileron movements from the ailerons to which they are operatively connected, respectively, due to the increased air pressures acting on the down aileron with tendency of the force unit to compress and thus preventing large down motion of the aileron. The magnitude of the force exerted by spring 41 of a force unit 30 can be varied by adjusting the position of collar 39 on tube 27 carried sleeve 38, while an adjustment in control surface or aileron setting relative to the wing axis can be made through the medium of jaw bolt 31 threaded into sleeve bushing 28 and lock nut 32. By such adjustments, modifications of the wing 10 characteristics or properties can be made.

With the cooperative arrangement of the flap 20 and each aileron 21, in the wing 10, as above described, the spaced relation between flap and aileron is maintained in the depressed or lowered positions thereof under high attack angle or low speed flight conditions, as shown in Fig. 1. This relation of the lowered or automatically depressed aileron 21 with respect to lowered flap 20 and the air displacement through passage P, is such as to position the aileron for maximum lift capacity increase to substantially add to the lift developed for the wing by lowered flap and opened passage. The relation of flap and aileron is also such in raised position under high speed flight, that they together define and carry out the normal or high speed contour and airfoil section for wing 10.

An application of the basic principles of the invention to an airplane wing of what may be termed a conventional type, is disclosed in Figs. 5 and 6 of the drawings. A wing 10' of the preferably symmetrical or double cambered forms (although the invention is not of course limited to application to such form of wing) particularly adapted to high speed aircraft, is provided with the lateral control surface or aileron forming trailing surfaces 21', only one of which is here shown. Such surfaces are as usual vertically swingable and in normal raised and neutral control positions carry out the normal high speed contour or airfoil section for wing 10', as shown by the full line position of surface 21' of Fig. 6. Each surface 21' is operatively coupled with a tube and force unit 24—30, of the arrangement hereinbefore described, which is operatively connected with a usual lateral control mechanism (not shown). The leading edge of a surface 21' of the form here shown is beveled or inclined downwardly and rearwardly at 21'', so that in maximum lowered position thereof, shown by Fig. 5, the surface increases the camber of wing 10' and consequently its lift capacity, as will be readily understood.

The tube and force unit 24—30, is set with respect to a surface 21' with which connected, to depress and lower the surface to increase lift capacity under high attack angle or low speed flight conditions of Fig. 5, and under low attack angle or high speed flight conditions to be forced and swung upwardly by the increased air pressures acting thereon and overcoming force unit 30, to the position of Fig. 6 carrying out the normal high speed contour of wing 10'. The lateral control actuation of opposite surfaces or ailerons 21', each coupled to a tube and force unit 24—30, is similar to that described with reference to Figs. 1 to 3, in that up aileron movement is of greater degree than down aileron movement, due to a compressing or yielding of the force unit of the down aileron. For example, in high speed flight of Fig. 6, up aileron position is shown by dotted lines, but down aileron is limited to the maximum lowered position of Fig. 5, continued down control movement being taken up by compression of the force unit. In low speed flight of Fig. 5, free up aileron movement to dotted line position of aileron 21' is carried out, while the opposite depressed aileron is at its maximum lowered position and no down control movement of such aileron takes place, such movement being taken up by compression of the force unit 30 and lengthening of tube unit 24.

With the embodiment of Figs. 5 and 6, increased speed range for the wing 10 is obtained by decrease in the low speed due to the simultaneous lowering of the trailing edge surfaces 21' under low attack angle or low speed conditions, while the high speed contour of the wing is automatically restored by raising of surfaces 21' under the conditions of low angle or high speed flight. The operation of surfaces 21' as lateral control surfaces is carried out in all automatically assumed positions of such surfaces, while their control effectiveness is increased, with decrease in turning or yawing tendency, by the differential up and down aileron movements made possible and caused by the tube and force units 24—30.

Figure 7:
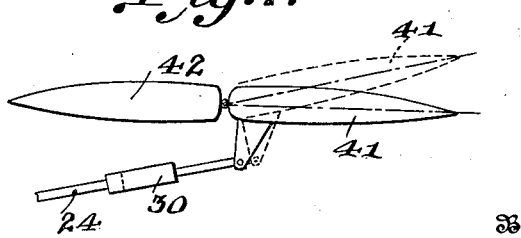
Fig. 7 is a purely diagrammatic view in outline of the application of the invention and the force unit thereof to a control surface provided by the elevator of an airplane.

In a further adaptation of the tube and force unit 24—30 of the invention, shown more or less diagrammatically in Fig. 7 of the drawings, such a tube and force unit is applied to and operatively coupled with the elevator 41 of an airplane tail group or empennage which includes the horizontal stabilizer 42 to which the elevator is pivoted for vertical swinging in the usual manner. The tube unit 24 is coupled to the usual pilot's control (not shown) for operation to vertically swing elevator 41 in the usual manner. The setting of tube and force unit 24—30, is such that in ordinary flight the elevator remains in normal or neutral control position, shown in full lines by Fig. 7, but of course within the limit of the initial force of unit 30.

In flight operation, during excessive dives of the airplane having the empennage including the stabilizer 42 and elevator 41, the latter will raise in relation to the control in which tube and force unit 24—30 is connected and forms a part, due to the air pressures on the elevator overcoming force unit 30, thus removing or substantially reducing the possibility of over control by operation of elevator 41. During excessive stalled flight of the airplane with a loss of altitude, the elevator 41 overcomes force unit 30 and raises in relation to the control, which permits of the airplane being held in such settling attitude, thereby increasing control effectiveness. Given sufficient control movement there will be no appreciable loss in the maximum control.

It is to be here noted that the force unit 30 can be mounted and installed in other control systems and for cooperative functioning with other control surfaces. For example, on one or both sides of a vertical rudder (not shown) or of an elevator or horizontal control surface, in order to absorb shocks or regulate control surface movements, as will be apparent from the preceding explanation of the principles of the invention. Attention is further directed to the fact that with lateral control surfaces, such as 21 or 21', or other control surfaces, the invention contemplates and includes the provision of any desired number of the units 24—30 to each surface spaced along the span thereof and properly linked in the control system, where the size of the surface dictates the expediency of a plurality of such units.

It is also evident that various changes, modifications, variations, substitutions, additions and eliminations might be resorted to, as well as other applications and embodiments carrying out the basic principles of the invention, without departing from the spirit and scope of the invention, and hence I do not desire to limit myself in all respects to the exact and specific disclosures hereof.

What I claim, is:

1. In combination, an airplane wing, an aileron on the wing, and means automatically positioning the aileron to increase lift capacity of the wing when the wing is under high attack angle or low speed flight conditions.

2. In combination, an airplane wing, a vertically swingable aileron on the wing, means automatically lowering the aileron to increase wing lift capacity under high attack angle or low speed flight conditions, and said aileron automatically raised by air pressures acting thereon under low attack angle or high speed flight conditions.

3. In combination, an airplane wing, a vertically swingable aileron thereon, lateral control mechanism for swinging said aileron, and means automatically lowering the aileron to increase wing lift capacity under high attack angle or low speed flight conditions, said aileron vertically swingable by the lateral control mechanism when in automatically lowered position.

4. In combination, an airplane wing, a vertically swingable aileron thereon, lateral control mechanism for swinging said aileron, means automatically lowering said aileron to increase the lift capacity of the wing under the conditions of high attack angle or low speed flight, said aileron automatically raised by air pressures acting thereon under the conditions of low attack angle or high speed flight, and said lateral control mechanism operable to swing said aileron for lateral control with the aileron in any automatically assumed position of the aileron.

5. An airplane wing, a vertically swingable lateral control surface thereon, resilient means operatively coupled with and exerting a force on the control surface throughout the normal flight range of the wings to lower the said control surface, said means lowering the control surface to wing lift capacity increasing position under the conditions of high wing attack angle or low speed flight, and the lateral control surface raised against the force exerted by said means by the pressures acting on the control surface under the conditions of low wing attack angle or high speed flight.

6. An airplane wing, a vertically swingable lateral control surface, mechanism for vertically swinging said lateral control surface, said mechanism including resilient means continuously exerting a force on the control surface throughout the normal flight range of sufficient magnitude to lower the same to increase wing lift capacity under the pressure conditions on the aileron at high wing attack angle or low speed flight, and said mechanism operable to vertically swing said surface for lateral control with the surface lowered by said resilient means.

7. An airplane wing, a vertically swingable lateral control surface, a push and pull tube unit operatively coupled with said surface for vertically swinging the same for lateral control, resilient means operatively associated with said tube unit to cause the same to automatically lower the lateral control surface under the pressure conditions acting on the control surface at normal high wing attack angle or low speed flight, said resilient means formed to yield under the pressures acting on the control surface at normal low attack angle or high speed flight for automatic raising of the control surface by such pressures against the force exerted by said resilient means.

8. An airplane wing, a vertically swingable control surface, a push and pull tube unit operatively coupled with said surface for vertically swinging the same for lateral control, said unit formed of telescopically fitting tube members for shortening and lengthening the unit to vertically swing said control surface independently of the swinging thereof by the unit for lateral control, and resilient means operatively associating said tube members to maintain the unit shortened to lower said control surface to increase wing lift capacity automatically under high angle of attack or low speed conditions of flight.

9. In combination, an airplane wing, a wing flap in normal raised position forming a portion of the wing under surface and downwardly swingable to positions increasing the camber of the wing, a vertically swingable lateral control surface on the wing, and means operatively associated with said control surface for automatically lowering the control surface to increase wing lift capacity under the conditions acting on the control surface when said flap is in lowered wing camber and lift increasing positions.

10. In combination, an airplane wing, a vertically swingable wing flap in raised position forming a portion of the wing under surface carrying out the normal wing contour and in lowered positions increasing the wing camber, said flap automatically actuated by airflow conditions thereon to lower under high attack angle conditions and raise under low attack angle conditions, a vertically swingable lateral control surface mounted in the wing, and means automatically lowering said control surface to increase wing lift capacity when said wing flap lowers, said control surface automatically raised to normal position by the airflow under the conditions causing and when said flap raises to normal position.

11. In combination, an airplane wing, a vertically swingable wing flap forming a portion of the wing under surface, a vertically swingable lateral control surface above said flap and forming a portion of the wing upper surface, and means causing said control surface to lower to increase wing lift capacity under the airflow conditions established when the flap is lowered.

12. In combination, an airplane wing, a vertically swingable wing flap forming a portion of the wing under surface, a vertically swingable lateral control surface above said flap and forming a portion of the wing upper surface, said flap in normal raised position and said control surface in normal position together carrying out the normal wing contour, and said lateral control surface automatically lowered to increase wing lift capacity by airflow conditions established when said flap is lowered to camber increasing position, and raised to normal position when said flap is raised to normal position.

13. In combination, an airplane wing having an air displacement passage therethrough, a rear wing flap forming a portion of the wing under surface and vertically swingable to raised position closing said passage and to lowered position opening said passage and increasing wing camber, a vertically swingable lateral control surface above said flap and forming a portion of the wing upper surface, means automatically lowering said control surface when said flap is lowered to position for displacement of air from said passage between said flap and lowered control surface.

14. In combination, an airplane wing, a vertically swingable wing flap forming a portion of the wing under surface, a vertically swingable flap member above said wing flap and forming a portion of the wing upper surface, said flaps in normal positions together forming and carrying out the normal wing contour, said flaps independently automatically controlled by air pressures acting thereon to lower in spaced relation to wing lift capacity increasing positions for displacement of air therebetween with the wing under high attack angle or low speed flight conditions, and to raise to normal positions under low attack angle or high speed flight conditions.

15. In combination, an airplane wing, an automatically actuated vertically swingable wing flap forming a portion of the wing under surface, a vertically swingable lateral control surface above said wing flap, and pilot controlled means for vertically swinging said surface for lateral control, downward swinging of said control surface with the flap in raised position tending to depress the flap to wing lift capacity increasing position.

16. In combination, an airplane wing having an air displacement passage therethrough, an automatically airflow controlled vertically swingable wing flap forming a portion of the wing under surface, said flap in raised position closing said passage and in lowered positions opening the same, a vertically swingable lateral control surface above said wing flap and forming a portion of the wing upper surface, lateral control mechanism for vertically swinging said control surface, and the said lateral control surface arranged in cooperative relation with the wing flap and displacement passage, such that with the flap raised down movements of the control surface depress the flap, and with the flap lowered and passage open up movements of the control surface increase the flow of air through the passage.

17. In combination, an airplane wing, a vertically swingable wing flap forming a portion of the wing under surface, a vertically swingable lateral control surface above said flap and forming a portion of the wing upper surface, said flap automatically functioning to lower with the wing under high attack angle or low speed flight conditions and to raise to normal position under low wing attack angle or high speed conditions, means automatically lowering said control surface to increase wing lift capacity with said flap lowered, said control surface automatically raised to normal position by air pressures acting thereon under low attack angle or high speed flight conditions, and lateral control mechanism operable to vertically swing said control surface for lateral control during and in any automatically assumed raised or lowered position of the control surface.

18. In combination, an airplane empennage, including a vertically swingable elevator, control mechanism for swinging said elevator, and said mechanism including a force unit operatively associated therewith exerting a force on the elevator continuously tending to lower the same during flight, the force exerted by said unit of a magnitude to be overcome by air pressures acting on the elevator under driving conditions of flight for automatic upward swinging of the elevator in relation to the control mechanism to reduce over control.

19. A control surface operating tube and force unit for operative connection between a control surface and control mechanism therefor, including telescopic tube members, a collar carried by each tube member, a coil spring around said tube members under compression between and normally forcing said collars apart to maintain the tube unit at its minimum length, and said tube members extensible to increase the length of the unit by the application of a force thereto to further compress said spring to draw said collars toward each other and move said telescoped members outwardly of each other.

20. In combination, an airplane wing, a wing camber varying flap member automatically actuated to increase wing camber under high attack or low speed wing flight conditions and to decrease wing camber under low attack angle or high speed conditions, and a lateral control surface on the wing automatically actuated to positions relative to and co-operating with the automatically assumed camber varying positions, respectively, of said flap member, said control surface operable for lateral control in any automatically assumed position thereof.

21. In combination, an airplane wing, a vertically swingable wing camber varying flap member on the wing, said member automatically actuated to increase wing camber under high angle or low speed wing flight conditions and to decrease wing camber under low attack angle or high speed conditions, and a vertically swingable lateral control surface automatically actuated to swing downwardly and upwardly and in relative cooperating positions relative to and in accordance with swinging of the said wing flap.

22. The combination with an airplane wing, and means thereon for changing the normal wing characteristics to increase the wing lift capacity, of a lateral control surface on the wing automatically actuated when the wing characteristics are changed to assume a position cooperating with and contributing to the changed wing characteristics for increased lift capacity, and mechanism for positively operating said surface for lateral control in any automatically assumed position of the said surface.

23. In combination, an airplane wing, a wing flap in normal raised position forming a portion of the wing under surface and downwardly swingable to positions increasing the camber of the wing, a vertically swingable lateral control surface above said flap and forming a portion of the wing upper surface, and means for lowering the control surface to a re-adjusted position increasing wing lift capacity when the said flap is in a lowered wing camber and lift increasing position, said control surface vertically swingable independently of said flap for lateral control when in any such lowered re-adjusted wing lift capacity increasing position.

24. In combination, an airplane wing, a wing flap in normal raised position forming a portion of the wing under surface and downwardly swingable to positions increasing the wing camber, vertically swingable lateral control surfaces above said flap and forming portions of the wing upper surface, and means for simultaneously lowering the control surfaces to positions increasing wing lift capacity when the flap is in a lowered wing camber and lift increasing position, said control surfaces vertically swingable for lateral control when in any lowered wing lift capacity increasing position.

Signed at Rochester, Monroe County, New York, this 29th day of May, 1931.

RANDOLPH F. HALL.